(12) United States Patent
Matsumoto

(10) Patent No.: US 6,271,515 B1
(45) Date of Patent: Aug. 7, 2001

(54) COLUMN SWITCH FOR VEHICLES INCLUDES A FLEXIBLE CABLE

(75) Inventor: Tsuyoshi Matsumoto, Tokyo (JP)

(73) Assignee: Niles Parts Co., Ltd., Toyko (JP)

( * ) Notice: Subject to any disclaimer, the term of this patent is extended or adjusted under 35 U.S.C. 154(b) by 0 days.

(21) Appl. No.: 09/268,341

(22) Filed: Mar. 16, 1999

(30) Foreign Application Priority Data

Jun. 30, 1998 (JP) .................................................. 10-199858

(51) Int. Cl.$^7$ ....................................................... H01J 5/02
(52) U.S. Cl. ...................... 250/239; 250/231.13; 439/164
(58) Field of Search .............................. 250/239, 227.22, 250/231.13, 231.18, 236, 559.37; 439/164, 488, 15; 200/61.54, 61.38, 61.27, 293–307, 329, 345

(56) References Cited

U.S. PATENT DOCUMENTS 5,928,018 * 7/1999 Dumoulin ............................ 439/164
5,971,782 * 10/1999 Masuda ................................ 439/164

FOREIGN PATENT DOCUMENTS 13-43053  4/1991 (JP) .

* cited by examiner

Primary Examiner—Que T. Le
(74) Attorney, Agent, or Firm—Ronald P. Kananen; Rader, Fishman & Grauer

(57) ABSTRACT

A column switch that electrically connects a steering wheel side and a vehicle side in an automobile using a flexible flat cable (5). The cable (5) is in the form of a spiral and is accommodated in a housing. The housing includes a lower part defined by a base (1) of the column switch (8), and an upper part defined by a rotor (6) having a cancel cam (6e). The housing also has slits (6f) or reflectors formed thereon for a steering angle sensor (10). The base (1) has a hollow cylinder (1a) formed in the middle thereof through which a steering shaft is inserted. An annular groove (1f) that accommodates the flat cable (5) therein is formed to surround the hollow cylinder (1a). The rotor (6) has resilient fastening straps (6a) and an accommodating space (6d) that covers the annular groove (1f). The resilient fastening straps (6a) rotatably engage a fastening portion (1i) formed on the hollow cylinder (1a). With this construction, the base of the column switch and the housing of the rotary connector can be formed in one integral structure, thereby reducing the number of components and overall cost.

19 Claims, 9 Drawing Sheets

F I G. 1 1
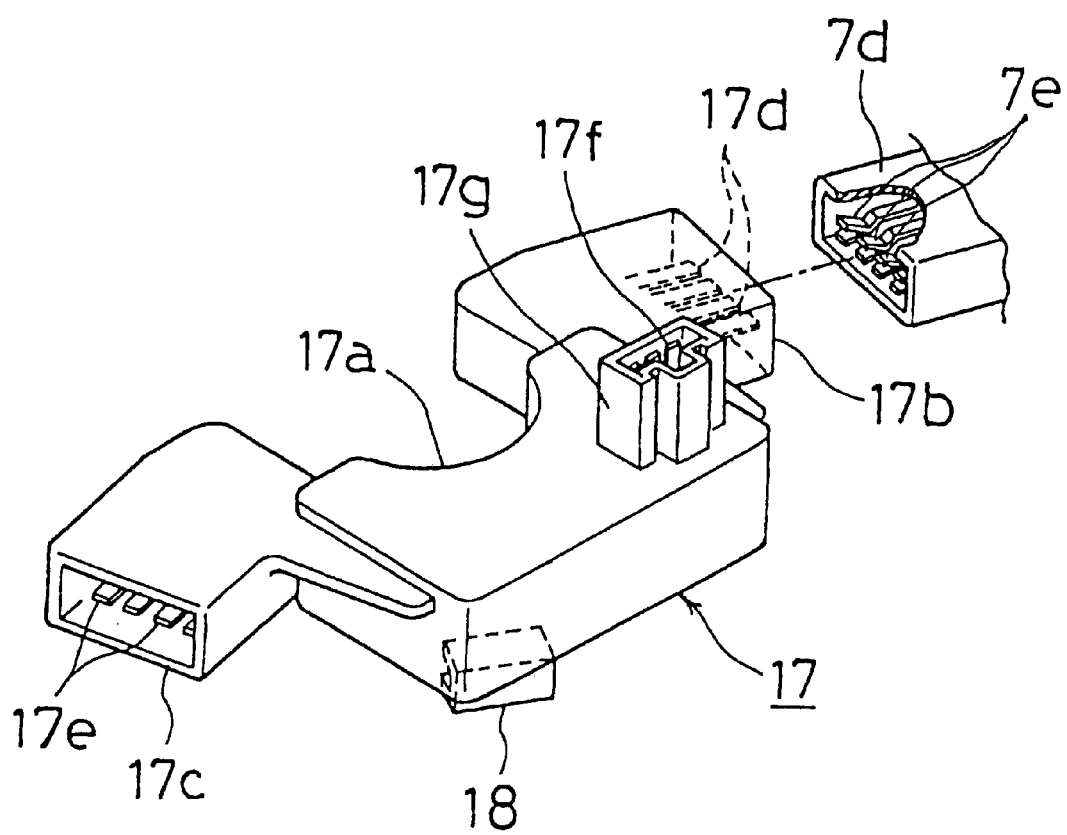

COLUMN SWITCH FOR VEHICLES INCLUDES A FLEXIBLE CABLE

BACKGROUND OF THE INVENTION

1. Field of the Invention

The present invention relates generally to a column switch for a vehicle and, in particular, to a column switch having a base on a steering wheel of an automobile that is integral with an on-vehicle rotary connector that makes electrical connection between the steering wheel and the steering column.

2. Description of the Related Art

A conventional column switch assembly having a rotary connector is disclosed, for example, in Japanese Utility Model Preliminary Publication (KOKAI) No. 3-43053. This conventional column switch assembly includes a rotary connector having a spiral-coiled flat cable that makes electrical connection between a steering wheel of an automobile and a steering column, and a column switch having, for example, an operation lever for a direction indicator. The rotary connector and the column switch are separate items. The rotary connector has a lower housing secured on a base of the column switch and an upper housing secured to an underside of the steering wheel.

The conventional column switch assembly described above suffers from a problem that the base of the column switch and the housing of the rotary connector are separate items, requiring a large number of parts and man-hours for assembly. In addition, the construction requires a large mounting space.

SUMMARY OF THE INVENTION

An object of the present invention is to provide a structure that serves as both a housing for a rotary connector and a base for a column switch, thereby reducing the number of parts and overall cost of the column switch and rotary connector assembly.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, in order to achieve the objects set forth above, a column switch is provided that has a rotary connector and a flexible flat cable in a spiral form accommodated in a housing of the rotary connector. The flexible cable is adapted to make electrical connection between a steering wheel side and a vehicle side. The housing includes a lower part defined by a base of the column switch, an upper part defined by a rotor having a cancel cam, and slits or reflectors formed on the housing for a steering angle sensor.

The base of the column switch has a hollow cylinder in the middle thereof through which a steering shaft is inserted, and an annular groove surrounding the hollow cylinder for accommodating the flat cable. The rotor has a resilient fastening strap and an accommodating section that covers the annular groove. The resilient fastening strap rotatably engages a fastening portion formed on the hollow cylinder.

In one embodiment, slits are formed in the lower peripheral end portion of the rotor, and the steering angle sensor has a detector disposed on the bottom of the annular groove. The detector includes a light-receiving element and a light emitting element.

In another embodiment, the rotor has a flange formed at a lower end thereof, and slits are formed in the flange. The steering angle sensor has a detector disposed on an inner wall of the annular groove. The detector includes a light-receiving element and a light-emitting element.

In another embodiment, the reflectors are formed on an outer peripheral surface of the rotor, and the steering angle sensor includes a detector disposed on an inner wall of the annular groove. The detector includes light-receiving/emitting elements therein.

The base of the column switch has a steering angle sensor and is formed with recesses on the left and right sides. The switch bodies of a turn signal switch and a wiper/washer switch or the like are fitted into the recesses. Each of the switch bodies has a connector on an underside thereof. The steering angle sensor is provided in a terminal block. The terminal block is secured to the base and has a first connector and a second connector, each of which fit into one of the connectors on the underside of the switch bodies.

The terminal block has a third connector incorporating terminals therein that are electrically connected to the connectors on the underside of the switch bodies, the detector of the steering angle sensor, and the flat cable.

In one embodiment, the switch bodies have the connectors on their undersides oriented substantially toward the recesses. In this embodiment, the terminal block has the first connector and second connector oriented outward so that the first and second connectors are in alignment with the connectors on the underside of the switch bodies.

In another embodiment, the switch bodies are formed with their connectors oriented downward. In this embodiment, the terminal block has the first connector and the second connector oriented upward so that the first and second connectors are in alignment with the connectors on the switch bodies.

BRIEF DESCRIPTION OF THE DRAWINGS

The present invention will become more clearly appreciated as the disclosure of the invention is made with reference to the accompanying drawings. In the drawings:

FIG. 11 is a perspective view of the fourth embodiment of the present invention, illustrating the fitting relation between the terminal block and the connectors on the switch bodies.

DETAILED DESCRIPTION OF THE PREFERRED EMBODIMENTS

A first embodiment of the present invention will be described in detail with reference to FIGS. 1 to 5 of the accompanying drawings.

Figure 3:
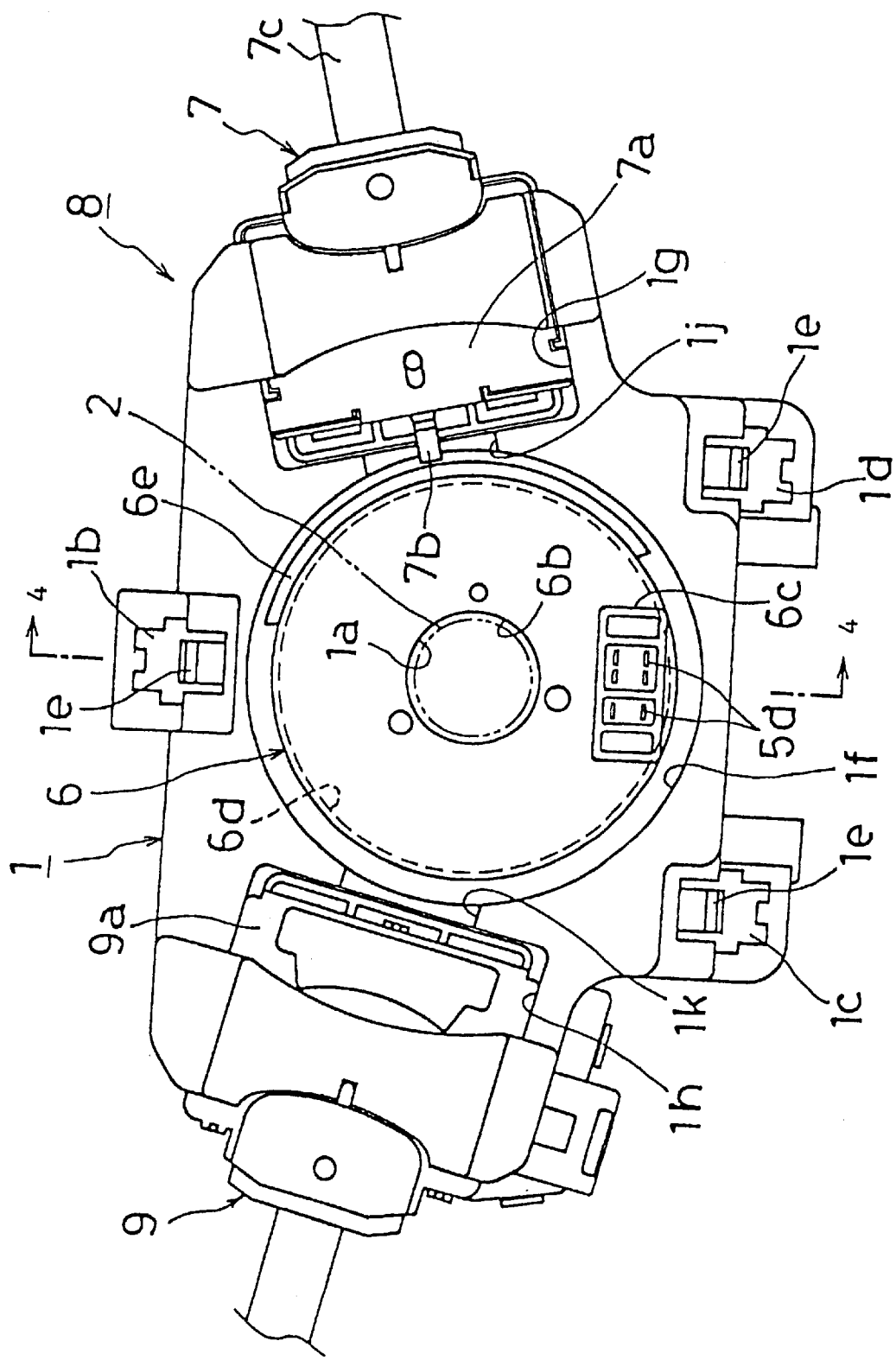
FIG. 3 is an enlarged top view in partial cross section, illustrating the first embodiment of the invention.
Figure 4:
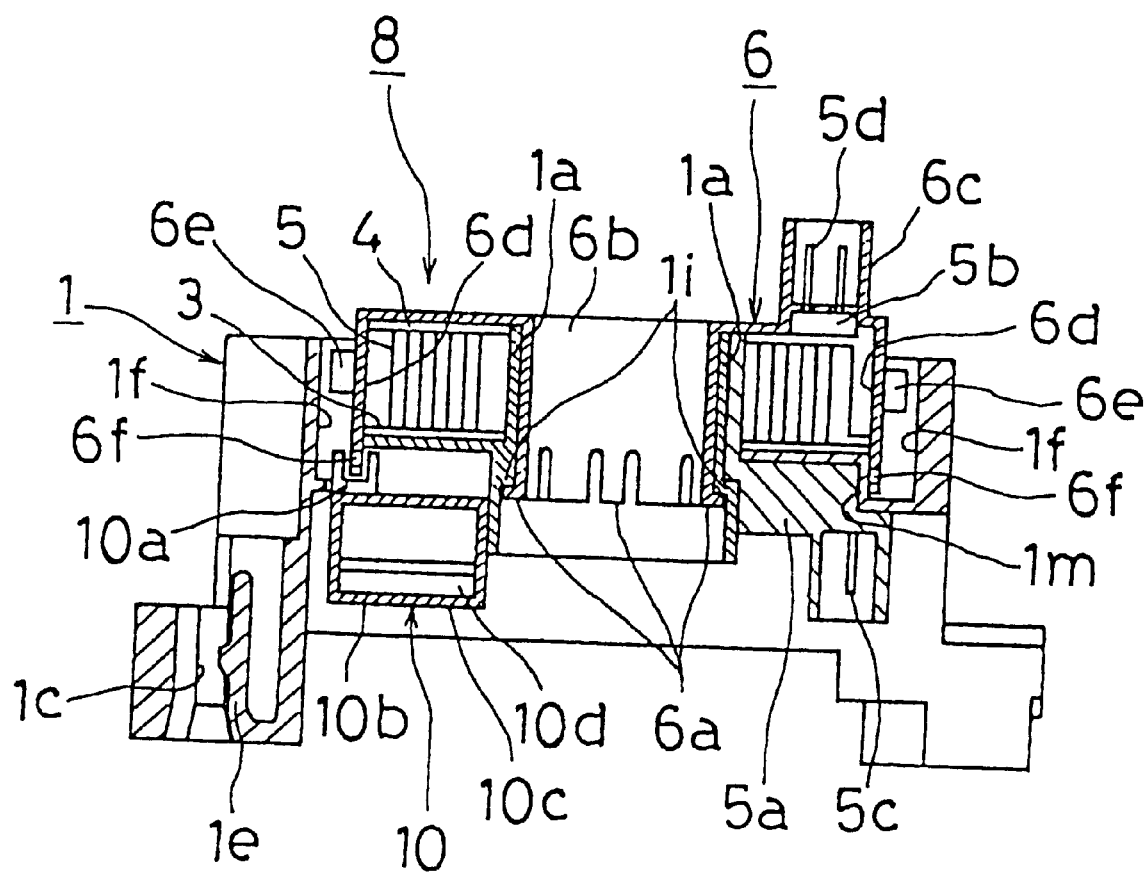
FIG. 4 is a cross-sectional view taken along the lines 4—4 of FIG. 3.
Figure 5:
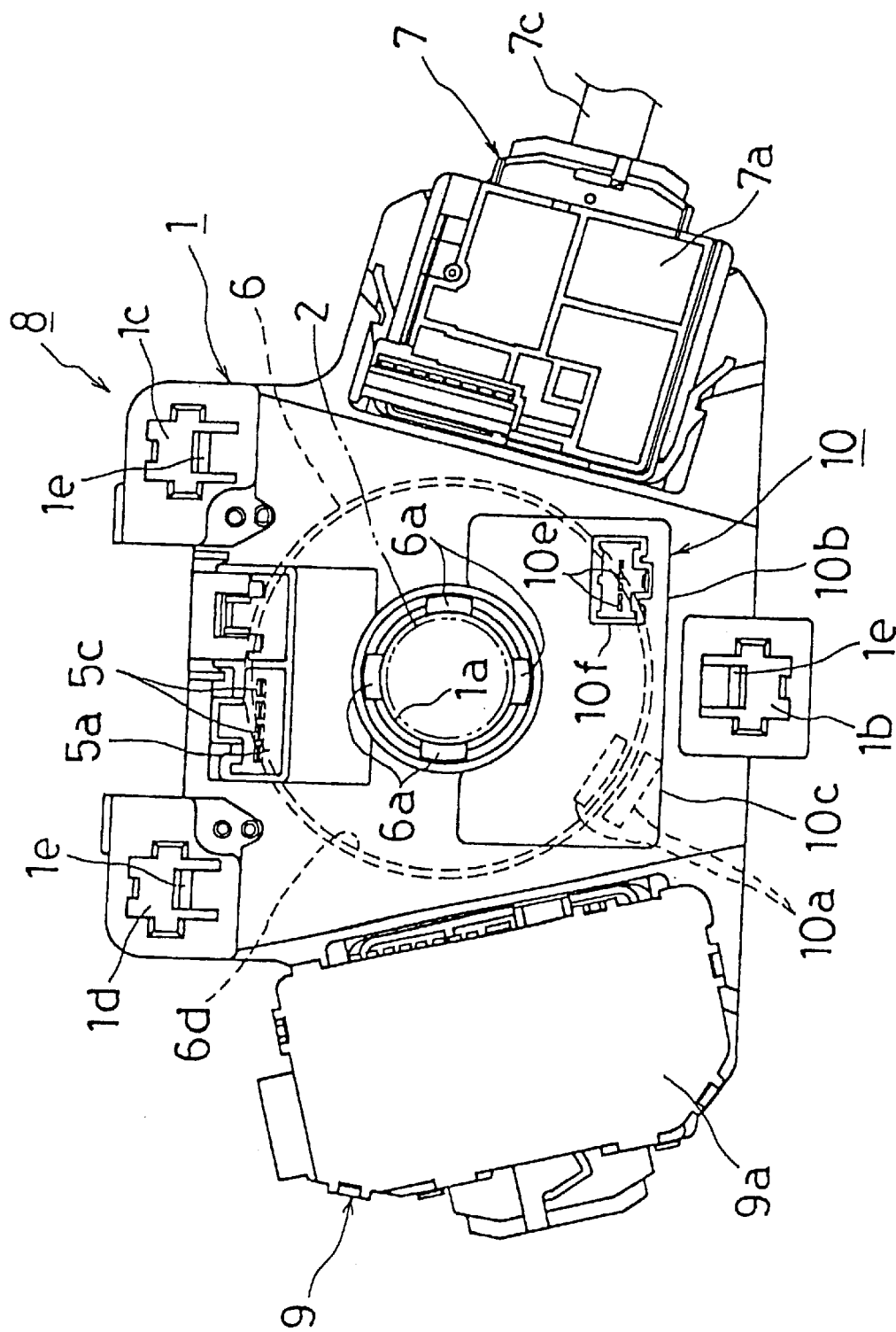
FIG. 5 is an enlarged bottom view of the first embodiment of the present invention.

As shown in FIGS. 3 and 5, a base 1 of a column switch 8 has a hollow cylinder 1a in the middle thereof through which a steering shaft 2 is inserted. The base 8 has mounting sections 1b, 1c and id fittingly mounted to a steering column (not shown), and is secured to the steering column by a fastening tongue 1e. As shown in FIG. 4, the base 1 has an annular groove 1f surrounding the hollow cylinder 1a. The annular groove 1f accommodates slide sheets 3 and 4, a flat cable 5, and a rotor 6 inserted therein. The base 1 is formed with recesses 1g and 1h in the left and right sides of the base 1. The recesses 1g and 1h fittingly receive, for example, a body 7a of a turn signal switch 7 and a body 9a of a wiper/washer switch 9, respectively.

As shown in FIG. 4, the hollow cylinder 1a has a fastening portion 1i in the form of a stepped portion with which a resilient fastening strap 6a formed on an inner wall of the rotor 6 is engaged. As shown in FIG. 3, the annular groove 1f communicates with the recesses 1g and 1h through cutouts 1j and 1k formed on the left and right sides. A cancel claw 7b of the turn signal switch 7 extends into or retracts from the annular groove 1f through the cutout 1j or 1k.

The base 1 has the two cutouts 1j and 1k so that the construction can commonly be applied to both a left-hand-drive vehicle and a right-hand-drive vehicle. For a right-hand-drive vehicle, the turn signal switch 7 is inserted into the recess 1g so that operating the operation lever 7c causes the cancel claw 7b to extend into or retract from the annular groove 1f through the cutout 1j. For a left-hand-drive vehicle, the turn signal switch 7 is inserted into the recess 1h so that operating the operation lever 7c causes the cancel claw 7b to extend into and retract from the annular groove 1f through the cutout 1k. A fitting hole, not shown, is formed in a bottom surface of the hollow cylinder 1a. The fitting hole receives a terminal 5a attached to an outer end of a flat cable 5.

The steering shaft 2 is rotatably inserted into the steering column, extending through the hollow cylinder 1a and shaft hollow cylinder 6b. The steering shaft 2 is fixedly mounted to the steering wheel and rotates together with the rotor 6 whenever the steering shaft 2 is rotated.

The slide sheets 3 and 4 are a thin flat ring made of a highly lubricating oleoresin or the like. The slide sheet 3 is placed on the inner bottom of the annular groove 1f, as shown in FIG. 4, and under the flat cable 5. The slide 3 is formed with a hole, not shown, in the middle of the slide 3. The hollow cylinder 1a fits into the hole. The slide sheet 4 is disposed over the flat cable 5. The slide sheet 4 is formed with a hole, not shown, in the middle thereof into which the hollow cylinder 1a fits. The slide sheet 4 is also formed with a cutout, not shown, in an outer circumference thereof. The terminal 5b is inserted into the cutout.

The flat cable 5 includes flat thin conductors connected to the terminals 5c and 5d. The conductors are insert-molded with a highly lubricating resin into a thin belt-like shape. A terminal 5a is connected to an outer end of the flat cable 5, and a terminal 5b is connected to an inner end of the flat cable 5. The flat cable 5 is wound in a spiral shape and is accommodated in the annular groove 1f with the slide sheet 3 under the flat cable 5 and the slide sheet 4 over the flat cable 5. Then, the rotor 6 is fitted over the flat cable 5, thereby enclosing the flat cable in the annular groove 1b.

Upon fittingly mounting the terminal 5a into the connector-inserting hole 1m formed in the bottom of the annular groove 1f, the terminals 5c are placed in position at a lower area of the base 1. The terminal 5b has terminals 5d fitted to a connector housing 6c formed on top of the rotor 6.

The rotor 6 is a doughnut-shaped rotary case that rotates with the steering wheel. The rotor 6 has the connector housing 6c which is formed on the rotor 6 and projects upwardly from the rotor 6. The connector housing 6c fits to its mating connector, not shown, provided under the steering wheel, thereby positioning the rotor 6 with respect to the steering wheel.

Figure 1:
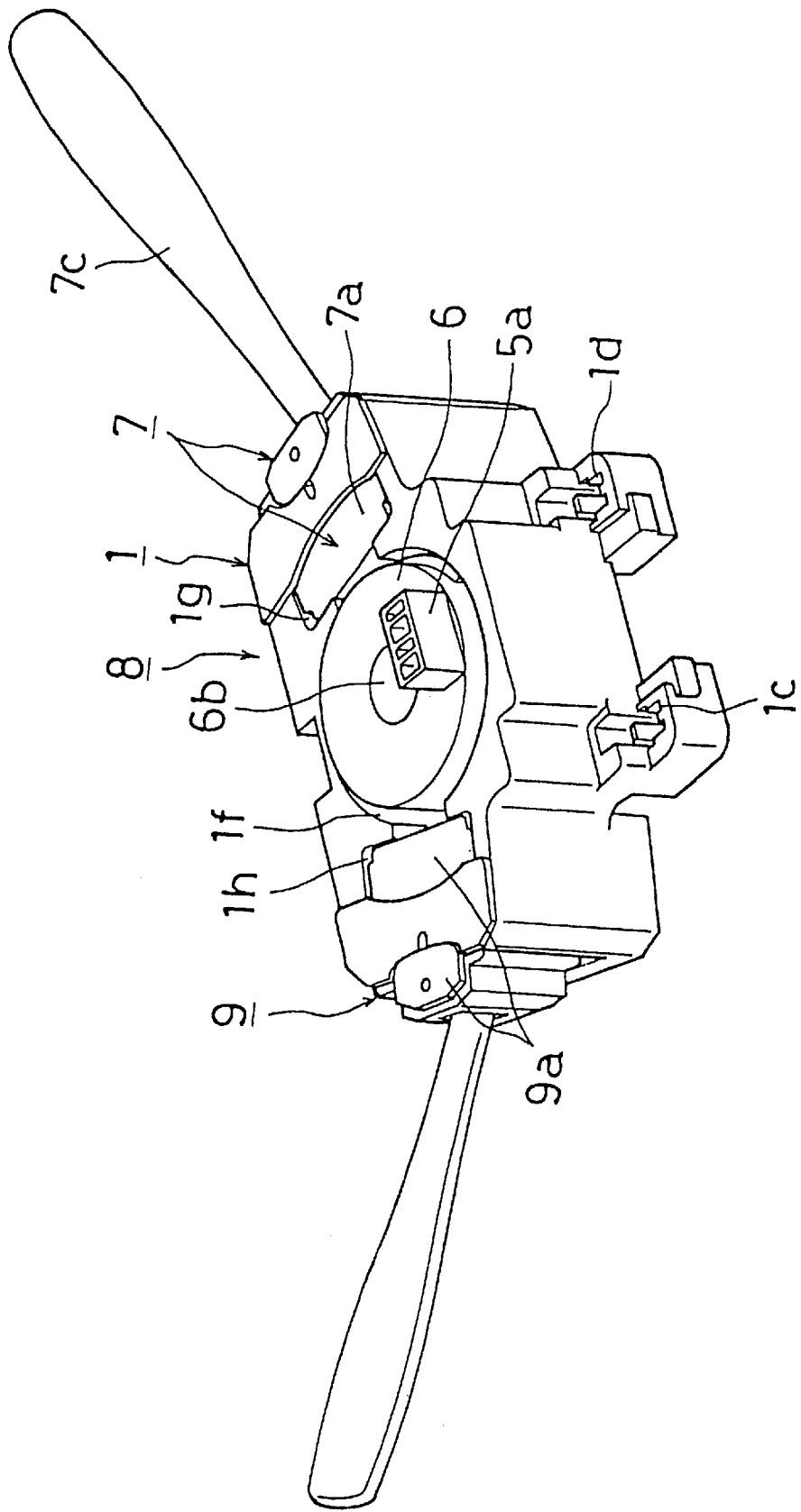
FIG. 1 is a perspective view of a first embodiment of the present invention.
Figure 2:
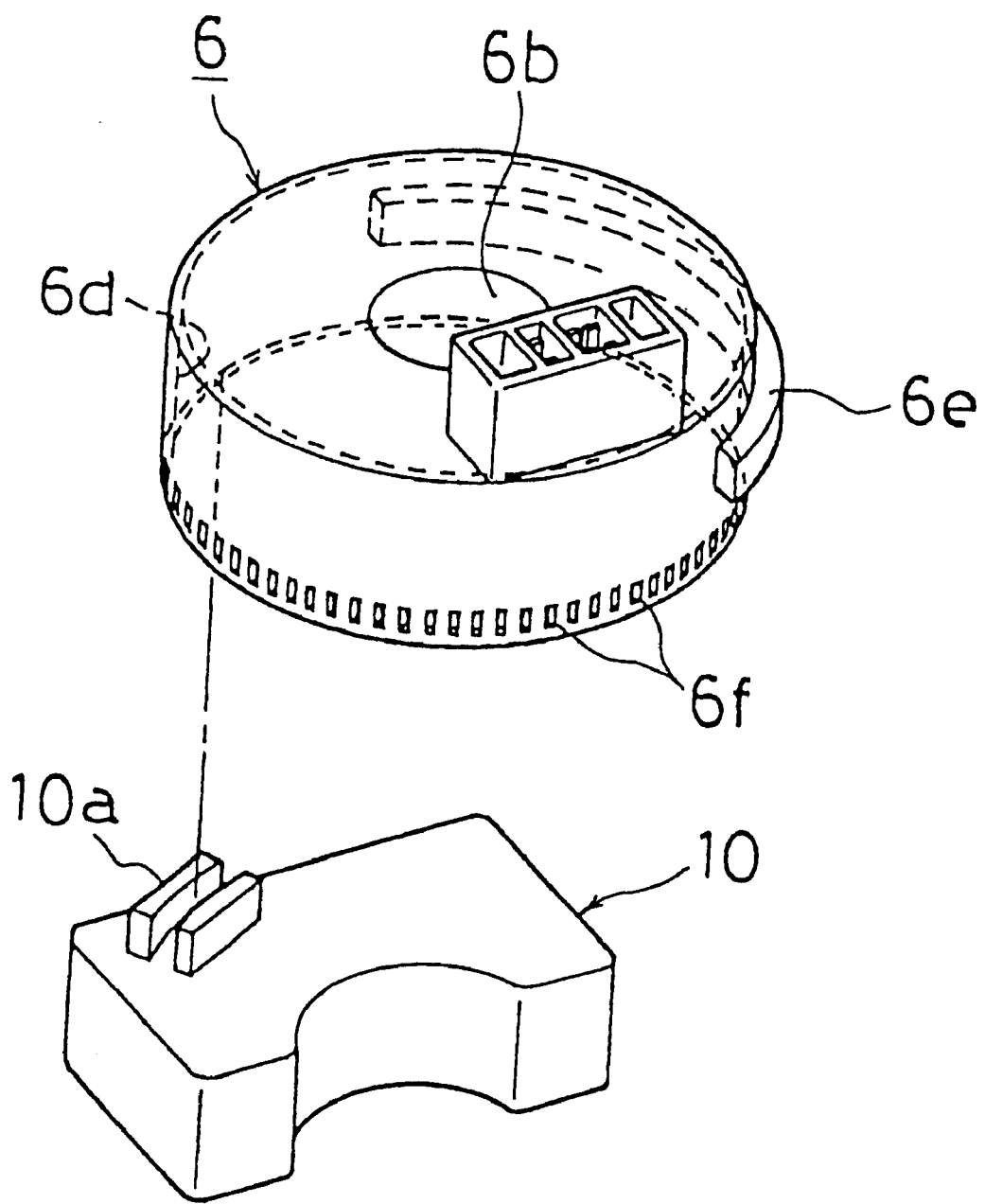
FIG. 2 illustrates the first embodiment of the invention, showing the cancel cam and the steering angle sensor.

The rotor 6 has an accommodating section 6d that encloses the flat cable 5 from above. The rotor 6 is rotatably inserted into the annular groove 1f. The rotor 6 has a shaft hollow cylinder 6b in the middle thereof, and the steering shaft 2 is inserted into the shaft hollow cylinder 6b. The shaft hollow cylinder 6b has a plurality of resilient fastening straps 6a, which are rotatably inserted into the hollow cylinder 1a and rotatably engage the fastening portion 1i formed on the hollow cylinder 1a, as shown in FIGS. 4 and 5. The rotor 6 has a cancel cam 6e formed on its outer circumference, as shown in FIGS. 2, 3, and 4. The cancel cam 6e strikes the cancel claw 7b of the turn signal switch 7.

The cancel cam 6e is not limited in number and shape to that of the present embodiment. The rotor 6 may be assembled to the base 1 with a coil spring placed between the rotor 6 and the base 1 so that the rotor 6 presses the underside of the steering wheel at all times. The resilient fastening straps 6a of the rotor 6 and the fastening portion ii of the base 1 may be reversed with their locations. That is, the fastening portion 1i may be formed on the shaft hollow cylinder 6b, and the resilient fastening strap 6a may be formed on the hollow cylinder 1a.

As shown in FIG. 2, the rotor 6 is formed with a plurality of slits 6f formed in the lower circumferential surface thereof all around the rotor. The slits 6f pass through the detectors 10a of the steering angle sensor 10 when the rotor 6 is rotated. The steering angle sensor 10 includes the slits 6f, the detector boa, and a body 10b, and detects the steering angle of the steering wheel. The slits 6f are through-holes formed at predetermined constant intervals in the lower circumferential surface of the rotor 6, which is in the shape of a generally inverted cup. The slits 6f run through the detector 10a when the steering wheel is rotated.

The detector 10a includes the light-emitting element and the light-receiving element that detects the light emitted from the light-emitting element (both not shown). The light emitting element and the light-receiving element are disposed to oppose each other with the slit 6f therebetween. The body 10b is accommodated in a case 10c and is in the form of a board 10d having, for example, the light emitting element and light-receiving element mounted thereon. The steering angle sensor 10 detects the slits 6f passing a space between the light-emitting element and the light-receiving element when the rotor 6 is rotated, thereby detecting the steering angle of the steering wheel that rotates together with the slits 6f. The case 10c has a coupler 10f with a terminal 10e accommodated therein. The terminal 10e electrically connects the board 10d to, for example, the power supply.

The column switch 8 includes, for example, the body 7a of the turn signal switch 7 and the body 9a of the wiper/washer switch 9, fitted to the recess 1g and recess 1h on the right and left sides of the base 1, respectively. The column switch 8 may be of the construction where the turn signal switch 7 and the wiper/washer switch 9 and others are formed integral with the base 1.

The turn signal switch 7 has the operation lever 7c disposed on the body 7a and can be pivoted upward, downward, leftward and rightward. Operating the operation lever 7c to a left-turn position or a right-turn position causes the cancel claw 7b to advance into a path in which the cancel cam 6e rotates. Rotating the steering wheel causes the cancel cam 6e to strike the cancel claw 7b.

The assembly procedure and operation of the first embodiment having the aforementioned construction will now be described in further detail.

Switches, such as the turn signal switch 7 and the wiper/washer switch 9, are fitted into the recesses 1g and 1h of the base 1. The slide sheet 3 is placed on the bottom surface of the annular groove 1f.

The terminal 5b connected to one end of the flat cable 5 is inserted into the connector housing 6c and fixed to the rotor 6, so that the terminal 5b is fixedly placed in position in the connector housing 6c.

The terminal 5a connected to the other end of the flat cable 5 is inserted into the connector-inserting hole 1m, so that the flat cable 5 is fixedly positioned in the annular groove 1f of the base 1. The flat cable is then arranged in a spiral shape in the annular groove 1f to surround the hollow cylinder 1a.

The shaft hollow cylinder 6b of the rotor 6 is pushed into the hollow cylinder 1a, so that the resilient fastening strap 6a rotatably engages the fastening portion 1i. A housing that covers the flat cable 5 includes a lower part defined by the base 1 of the column switch 8 and an upper part defined by the rotor 6 on which a cancel cam 6e and in which slits 6f for the steering angle sensor 10 are formed, thereby reducing the number of parts and man-hours for assembly as well as achieving a space-saving construction. The base 1 has the mounting sections 1b, 1c, and 1d fitting to a bracket of the steering column, and is secured to the steering column. The connector housing 6c is fitted to the mating connector on the underside of the steering wheel, and the steering wheel is fixed to the steering shaft 2, thereby positioning the rotor 6 in place.

When the steering wheel is operated, the steering wheel rotates together with the rotor 6 and the terminal 5b connected to one end of the flat cable 5. If the operation lever 7c has been pivoted to either the left-turn position or the right-turn position, the cancel cam 6e strikes the cancel claw 7b, thereby allowing the operation lever 7c to return to the neutral position.

Operating the steering wheel also causes the slits 6f to run, so that the passage of light emitted from the light-emitting element to the light-receiving element is alternately allowed and blocked. Thus, the steering angle sensor 10 detects the steering angle of the steering wheel in terms of the slits 6f running through the sensor 10.

A second embodiment will now be described in detail with reference to FIGS. 6 and 7. The same elements as those of the first embodiment have been given the same numerals and references, and the further description thereof is omitted.

The second embodiment of the present invention is directed to a steering angle sensor that includes reflectors 12a and a detector boa. The reflectors 12 are provided in place of the slits 6f formed in the rotor 6 of the first embodiment. The detector 10a is a light-receiving/emitting element 13, as shown in FIG. 6, having a light-emitting element 13a and light-receiving element 13b.

Figure 6:
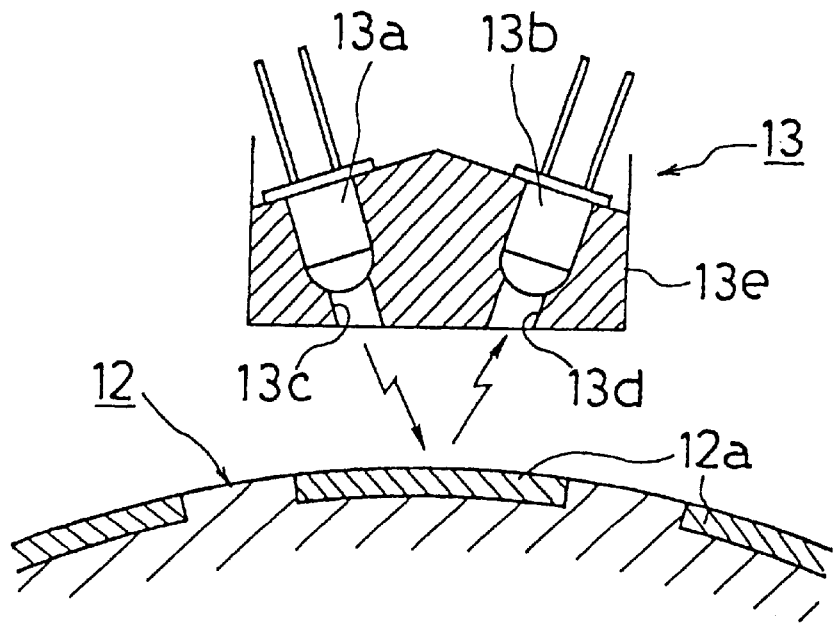
FIG. 6 is an enlarged cross-sectional view of the light-receiving and light-emitting elements of a second embodiment of the present invention.
Figure 7:
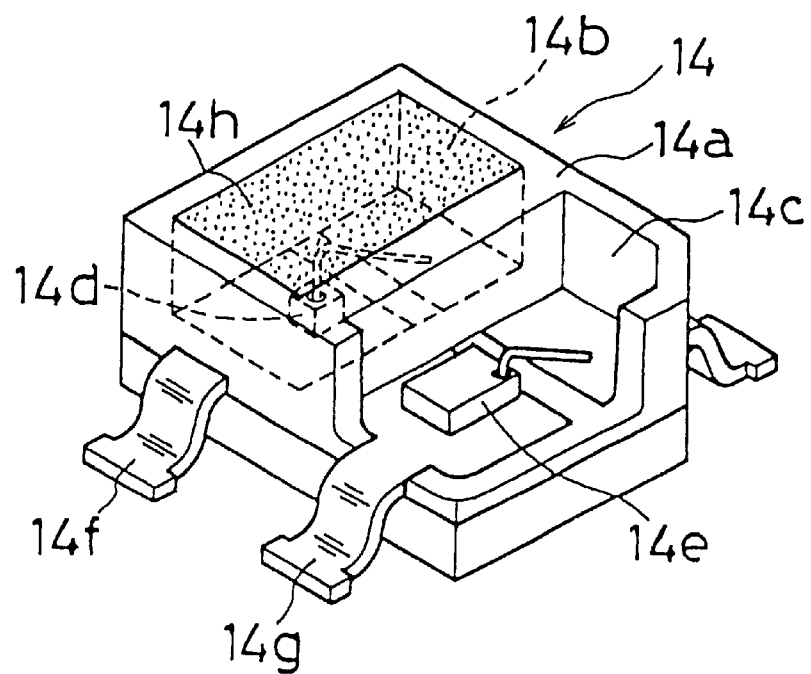
FIG. 7 is an enlarged cross-sectional view of the light-receiving and light-emitting elements of a variation of the second embodiment of the present invention.
Figure 9:
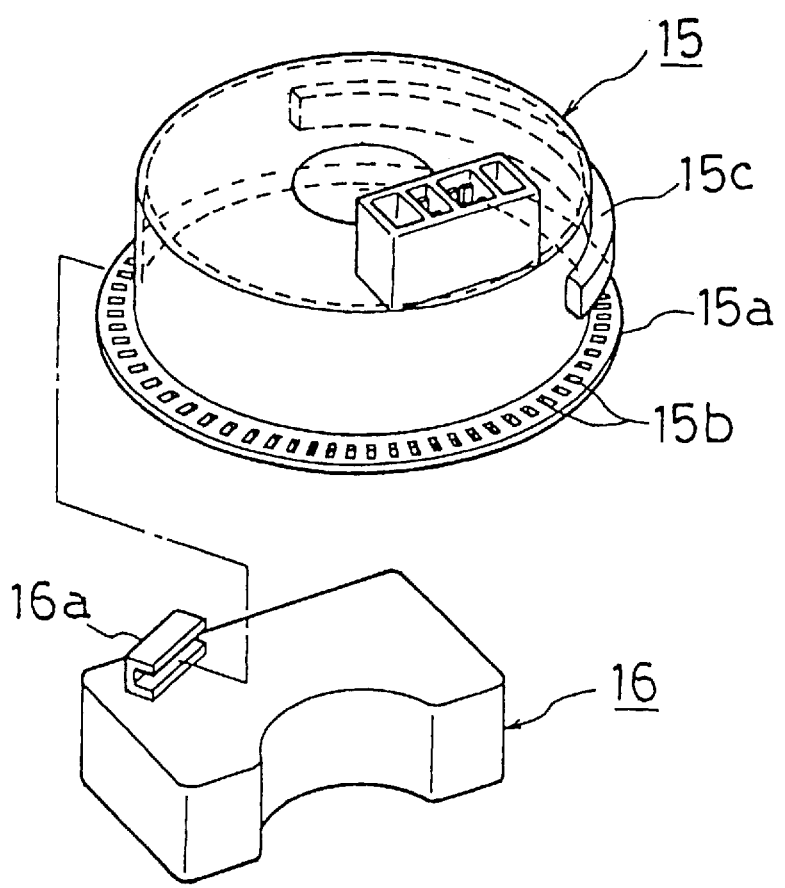
FIG. 9 is an illustrative diagram of the cancel cam and steering angle sensor of the third embodiment of the present invention.

The light-receiving/emitting element 13 shown in FIG. 6 is a light-receiving/emitting element for a so-called absolute steering angle detection. The light-receiving/emitting element 13 is a reflection type photosensor accommodated in a housing in which mounting holes 13c and 13d are formed. The light-emitting element 13a and light-receiving element 13b are mounted to the mounting holes 13c and 13d and are oriented toward the middle of the reflectors 12a formed on the rotor 12. Alternatively, the light-receiving/emitting element 13 may be of a mini reflection type photosensor, as shown in FIG. 7. The light-receiving/emitting element 14 shown in FIG. 7 has reflectors provided at the locations of slits formed in a flange of, for example, a rotor 15 of a later-described third embodiment. The reflectors are arranged at locations where the slits 15b of FIG. 9 are formed in the flange 15a. Disposed under the reflectors to oppose the reflectors are a desired number of light-receiving/emitting elements 14.

The light-receiving/emitting elements 14 each includes a package 14a, a light-emitting element 14d, a light-receiving element 14e, a lead 14f connected to the light-emitting element 14d, and a lead 14g connected to the light-receiving element 14e. The package 14a has two spaces 14b and 14c. The light-emitting element 14d and light-receiving element 14e are sealed in the spaces 14b and 14c, respectively, with an encapsulating material 14h, such as an epoxy resin, that blocks visible light.

The light-receiving/emitting elements 13 and 14 are disposed to oppose the reflectors 12a provided on, for example, the outer circumferential surface of the rotor 12.

Figure 8:
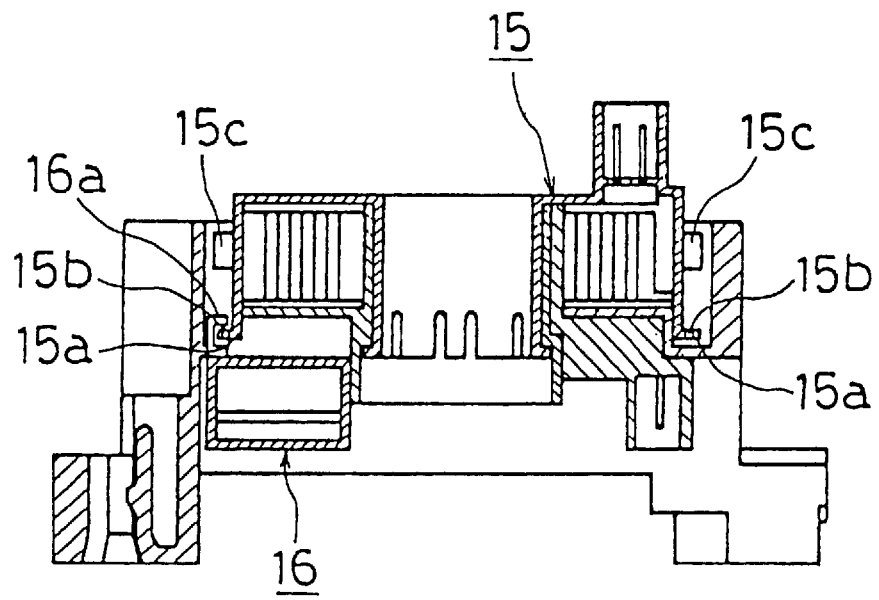
FIG. 8 is a central enlarged longitudinal cross-sectional view of a third embodiment of the present invention.

A third embodiment of the present invention will now be described in detail with reference to FIGS. 8 and 9.

The third embodiment of the invention is directed to a steering angle sensor 16 where a rotor 15 has a flange 15a formed at its lower end, slits 15b are formed in the flange 15a, and the light-emitting element and light-receiving element are vertically disposed with the slits 15b therebetween. The light-emitting element and light-receiving element are in the form of, for example, a photo-interrupter that serves as a detector 16a. The rotor 15 has a cancel cam 15c formed in a one-piece construction with the rotor 15 on the circumferential surface of the rotor 15. The cancel cam 15c has an outer circumferential surface to which a cancel claw 7b abuts. The detector 16a is disposed on the inner wall surface of the annular groove 1f near the bottom of the annular groove 1f. The operation of the third embodiment is the same as that of the first embodiment.

A fourth embodiment will now be described in detail with reference to FIGS. 10 and 11.

The fourth embodiment of the present invention provides a structure where the body 10b of the steering angle sensor 10 is in a one piece construction with the terminal that electrically connects the body 7a of the turn signal switch 7 to the body 9a of the wiper/washer switch 9, according to the first embodiment of the present invention. The terminal block 17 is mounted to the underside of the base 1 by, for example, screws.

The terminal block 17 has a curved surface 17a formed in its middle, the curved surface being configured to the cylindrical shape of the hollow cylinder 1a. Formed on both sides of the curved surface 17a are a first connector 17b and a second connector 17c in a one piece construction with the terminal block. The first and second connectors fit into connectors 7d and 9d disposed under the body 7a and 9d for electrical connection. The first and second connectors 17b and 17c can be of any shape and orientation as long as the turn signal switch 7 and wiper/washer switch 9 are electrically connected to each other.

Figure 10:
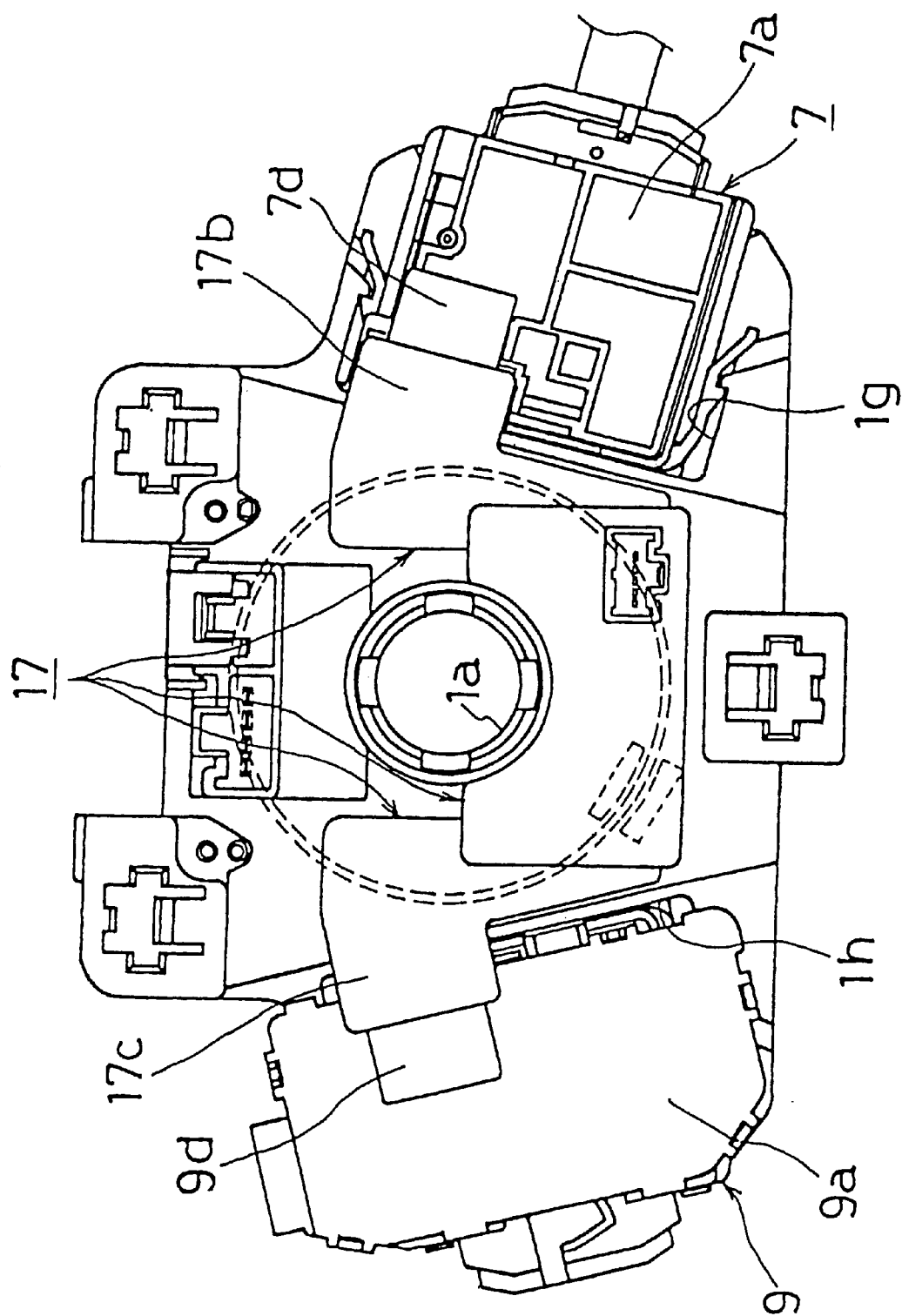
FIG. 10 is an enlarged bottom view of a fourth embodiment of the present invention.

For example, as shown in FIG. 10, the terminal block 17 is first secured to the base 1, and then the switch bodies 7a–and 9a are fitted into the recesses 1g and 1h. Thereafter, the connectors 7d and 9d are fitted into the first connector 17b and the second connector 17c. The first and second connectors 17b and 17c have terminals 17d and 17e, respectively, outwardly extending in directions in which the connectors 7d and 9d are inserted. The terminals 17d and 17e of the first and second connectors 17b and 17c and the terminals 7e of the connectors 7d and 9d can be of any shape as long as they fit to each other.

If the switch bodies 7a and 9a are to be first fitted to the base 1 and then the terminal block 17 is mounted to the base 1, the terminal block 17 should be designed with the connectors 7d and 9d oriented downward and the connectors 17b and 17c of the terminal block 17 oriented upward to oppose the connectors 7d and 9d. This construction allows the terminal block 17 to be mounted to the base 1, while at the same time the first and second connectors 17b and 17c are fitted to the connectors 7d and 9d.

The terminals 17d and 17e provided in the first and second connectors 17b and 17c can also be of any shape. The terminal block 17 incorporates the steering angle sensor 18 therein and has a third connector 17g formed on the underside thereof in a one piece construction therewith. The third connector 17g has terminals 17f electrically continuous to the terminals 17d and 17e. The terminals 17d, 17e and 17f are insert-molded with the terminal block 17. The third connector 17g is used for gathering electrical wires from the turn signal switch, wiper/washer switch 9, and steering angle sensor 18 at one place so as to connect the wires to, for example, a power supply. The terminal block 17 may be fastened to the base 1 by, for example, a resilient fastening means or any other means.

The present invention having the aforementioned construction has the following features and advantages.

According to a first aspect of the present invention, a column switch is provided having a rotary connector that electrically connects a steering wheel side to a vehicle side by means of a flexible flat cable in a spiral form accommodated in a housing. The housing includes a lower housing defined by a base of the column switch, an upper housing defined by a rotor having a cancel cam, and slits or reflectors for a steering angle sensor. The base of the column switch serves as a stator side housing of the rotary connector, while a rotor side housing includes the cancel cam for the turn signal switch and the slits or reflectors that serve as elements detected by the sensor. This construction provides a multifunction column switch and minimizes the size and mounting space required for the column switch. The construction also reduces the number of components and man-hours required for assembly, thereby reducing the overall cost.

According to a second aspect of the present invention, the base has a hollow cylinder formed in the middle thereof through which a steering shaft is inserted, and an annular groove formed to surround the hollow cylinder and to accommodate the flat cable therein. The rotor has a resilient fastening strap and an accommodating section that covers the annular groove. The resilient fastening strap rotatably engages a fastening portion formed on the hollow cylinder. This construction minimizes the overall size of the base and column switch.

According to a third aspect of the present invention, the slits are formed in the lower peripheral end portion of the rotor, and the steering angle sensor has a detector disposed on the bottom of the annular groove. The detector includes a light-receiving element and a light-emitting element. Thus, the rotor can be provided with both the cancel cam and slits that form the steering angle sensor, thereby reducing the number of parts and man-hours required for assembly.

According to a fourth aspect of the present invention, the rotor has a flange formed at a lower end thereof, and the slits are formed in the flange. The steering angle sensor has a detector disposed on an inner wall of the annular groove, the detector having a light-receiving element and a light-emitting element. Thus, the steering angle sensor can be easily assembled.

According to a fifth aspect of the present invention, the reflectors are formed on an outer peripheral surface of the rotor, and the steering angle sensor includes a detector disposed on an inner wall of the annular groove. The detector has light-receiving/emitting elements therein. This construction provides space-saving advantages.

According to a sixth aspect of the present invention, the base has a steering angle sensor and is formed with recesses on the left and right sides. The switch bodies of a turn signal switch and a wiper/washer switch or the like are fitted into the recesses. Each of the switch bodies has a connector on an underside thereof. The steering angle sensor is provided in a terminal block. The terminal block is secured to the base and has a first connector and a second connector, each of which is fitted into the corresponding connector. The steering angle sensor and the terminal block can be integrally constructed with connectors of the steering angle sensor. Thus, connectors on the left and right switch bodies can be located at one place, thereby greatly reducing the number of components and man-hours required for assembly.

According to a seventh aspect of the present invention, the terminal block has a third connector incorporating terminals therein that are electrically connected to the connectors, the detector of the steering angle sensor, and the flat cable. The steering angle sensor and the connectors on the left and right switch bodies can be located at one place so that they are connected to a power supply simultaneously, thereby reducing man-hours required for assembly.

According to an eighth aspect of the present invention, the switch bodies have their connectors oriented substantially toward the recesses. The terminal block has the first connector and the second connector oriented outward so that the first and second connectors are in alignment with the connectors on the switch bodies. Upon fixedly mounting the terminal to the base and fitting the left and right switch bodies into the recesses in the base, the connectors on the switch bodies and the first and second connectors of the terminal block can be fitted simultaneously, thereby improving assembly efficiency.

According to a ninth aspect of the present invention, the switch bodies are formed with their connectors oriented downward. The terminal block has the first connector and the second connector oriented upward so that the first and second connectors are in alignment with the connectors on the switch bodies. Upon fitting the left and right switch bodies into the recesses formed in the base and fixedly mounting the terminal block to the base, the connectors on the switch bodies and the first and second connectors of the terminal block can be simultaneously fitted, thereby improving the assembly efficiency.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. A column switch, comprising:
    a rotary connector;
    a flexible flat cable in a spiral form accommodated in a housing of the rotary connector, the flexible cable adapted to make electrical connection between a steering wheel side and a steering column side of a vehicle;
    wherein said housing comprises a lower part defined by a base of the column switch, and an upper part defined by a rotor having a cancel cam and slits or reflectors, said slits or reflectors being formed in a lower portion of the rotor for detection by a steering angle sensor.

2. The column switch according to claim 1, wherein the base comprises a hollow cylinder formed in a middle of the base adapted to receive a steering shaft, and an annular groove surrounding the hollow cylinder for accommodating the flat cable therein; and
    the rotor comprises an accommodating section that covers the annular groove, and a resilient fastening strap that rotatably engages a fastening portion formed on the hollow cylinder.

3. The column switch according to claim 2, wherein said slits or reflectors comprise slits which are formed in a lower, peripheral end portion of the rotor; and
    the steering angle sensor has a detector disposed on a bottom of the annular groove, the detector having a light-receiving element and a light-emitting element.

4. The column switch according to claim 2, wherein the rotor has a flange formed at a lower end thereof, and said slits or reflectors comprise slits which are formed in said flange; and
    said steering angle sensor has a detector disposed on an inner wall of the annular groove, the detector having a light-receiving element and a light-emitting element.

5. The column switch according to claim 2, wherein said slits or reflectors comprise reflectors which are formed on an outer peripheral surface of the rotor; and
    said steering angle sensor includes a detector disposed on an inner wall of the annular groove, the detector having light-receiving/emitting elements therein.

6. The column switch according to claim 1, wherein said slits or reflectors comprise slits which are formed in a lower, peripheral end portion of the rotor; and
    the steering angle sensor has a detector disposed on a bottom of the base, the detector having a light-receiving element and a light-emitting element.

7. The column switch according to claim 1, wherein the rotor has a flange formed at a lower end thereof, and said slits or reflectors comprise slits which are formed in said flange; and
    said steering angle sensor has a detector disposed on an inner wall of an annular groove of the base, the detector having a light-receiving element and a light-emitting element.

8. The column switch according to claim 1, wherein said slits or reflectors comprise reflectors which are formed on an outer peripheral surface of the rotor; and
    said steering angle sensor includes a detector disposed on an inner wall of an annular groove of the base, the detector having a light-receiving/emitting element.

9. The column switch according to claim 1, wherein said base has a steering angle sensor and is formed with recesses on a left side and a right side thereof into which switch bodies of a left/right turn signal switch and a wiper/washer switch are fitted, each of the switch bodies having a connector on an underside thereof, the steering angle sensor being provided in a terminal block, the terminal block being secured to the base and having a first connector and a second connector each of which fits into the connectors on the switch bodies, respectively.

10. The column switch according to claim 9, wherein said terminal block has a third connector incorporating terminals therein that are electrically connected to the connectors on the switch bodies, the detector of the steering angle sensor, and the flat cable.

11. The column switch according to claim 9, wherein the switch bodies have the connectors oriented substantially toward the recesses, and the terminal block has the first connector and the second connector oriented outward so that the first and second connectors are in alignment with the connectors on the switch bodies.

12. The column switch according to claim 9, wherein the switch bodies are formed with their connectors oriented downward, and the terminal block has the first connector and the second connector oriented upward so that the first and second connectors are in alignment with the connectors on the switch bodies.

13. The column switch according to claim 1, wherein said slits or reflectors are located in a lower periphery of said rotor, and said cancel cam is located on said rotor above said slits or reflectors.

14. A column switch assembly, comprising:
    a base having an annular groove surrounding an opening adapted to receive a steering shaft of a vehicle;
    a rotor covering the annular groove and secured to the base, said rotor having a cancel cam formed on an outer surface and slits or reflectors spaced about a lower circumference of the rotor below said cancel cam;
    a flexible flat cable in spiral form accommodated in the annular groove of the base, the flexible cable having an outer end connected to a terminal on the rotor and an inner end connected to a terminal on the base; and
    a steering angle sensor secured to the base and having a detector comprising a light-emitting element and a light-receiving element, said detector being positioned adjacent said slits or reflectors at the lower circumference of the rotor for detecting an angular position of said rotor.

15. The column switch assembly according to claim 14, wherein said detector of the steering angle sensor is disposed on an inner wall of the annular groove, said rotor has a flange formed at a lower end, and said slits or reflectors comprise slits which are spaced circumferentially about said flange for detection by said detector.

16. The column switch assembly according to claim 14, wherein said detector of the steering angle sensor is disposed on an inner wall of the annular groove, and said slits or reflectors comprise reflectors which are spaced about an outer circumferential surface of the rotor for detection by said detector.

17. The column switch assembly according to claim 14, wherein said base is formed with recesses on a left side and a right side thereof into which switch bodies of a left/right turn signal switch and a wiper/washer switch are fitted, each of the switch bodies having a connector on an underside thereof, the steering angle sensor being provided in a terminal block, the terminal block being secured to the base and having a first connector and a second connector each of which fits into the connectors on the switch bodies, respectively.

18. The column switch assembly according to claim 17, wherein the switch bodies have the connectors oriented substantially toward the recesses, and the terminal block has the first connector and the second connector oriented outward so that the first and second connectors are in alignment with the connectors on the switch bodies.

19. The column switch assembly according to claim 14, wherein said detector of the steering angle sensor is disposed on a bottom of the annular groove, and said slits or reflectors comprise slits which are spaced circumferentially about a lower, peripheral end portion of the rotor for detection by said detector.

* * * * *